United States Patent
Beck et al.

(10) Patent No.: US 9,589,227 B2
(45) Date of Patent: Mar. 7, 2017

(54) METHOD AND APPARATUS FOR IDENTIFYING A PRODUCT

(75) Inventors: Uwe Beck, Falkensee (DE); Andreas Hertwig, Berlin (DE); Dirk Hönig, Gottingen (DE); Ralph Domnick, Buckenhof (DE)

(73) Assignee: BAM Bundesanstalt Für Materialforschung Und-Prüfung, Berlin (DE)

( * ) Notice: Subject to any disclaimer, the term of this patent is extended or adjusted under 35 U.S.C. 154(b) by 563 days.

(21) Appl. No.: 12/735,092

(22) PCT Filed: Dec. 18, 2008

(86) PCT No.: PCT/EP2008/011101
§ 371 (c)(1),
(2), (4) Date: Jan. 4, 2011

(87) PCT Pub. No.: WO2009/077208
PCT Pub. Date: Jun. 25, 2009

(65) Prior Publication Data
US 2011/0095080 A1  Apr. 28, 2011

(30) Foreign Application Priority Data
Dec. 18, 2007 (DE) .................. 10 2007 063 415

(51) Int. Cl.
*G06F 17/00* (2006.01)
*G06K 19/14* (2006.01)
(Continued)

(52) U.S. Cl.
CPC .......... *G06K 19/14* (2013.01); *G07D 7/0046* (2013.01); *G07D 7/121* (2013.01); *B42D 2035/00* (2013.01); *B42D 2035/24* (2013.01)

(58) Field of Classification Search
CPC ............ G03F 7/70625; G03F 7/70616; G01N 2021/646; G01N 2021/8825; G01N 21/211;
(Continued)

(56) References Cited

U.S. PATENT DOCUMENTS 4,501,439 A    2/1985 Antes ............................ 283/91
4,695,162 A *  9/1987 Itonaga et al. ................ 356/369
(Continued)

FOREIGN PATENT DOCUMENTS

WO    9936805    7/1999

OTHER PUBLICATIONS

"Fundamentals and Applications of Spectroscopic Ellipsometry", Débora Gonçalves et al., 1002, Quim. Nova, vol. 25, No. 5, 794-800.*

*Primary Examiner* — Thien T Mai
(74) *Attorney, Agent, or Firm* — Dicke, Billig & Czaja, PLLC

(57) ABSTRACT

The present invention relates to a method and a corresponding apparatus for identifying a product (1) or information relating to the product (1). In the method, a concealed code on the product (1) is identified, wherein the code is given by a set of ellipsometric parameters, and the method comprises the following steps of: measuring ellipsometric variables for at least one defined point (8) on a surface (9) of the product (1), comparing the measured ellipsometric variables with at least one reference code, and determining a match between the measured ellipsometric variables and the reference code or one of the reference codes or determining a mismatch with each reference code.

23 Claims, 2 Drawing Sheets

Figure 1:
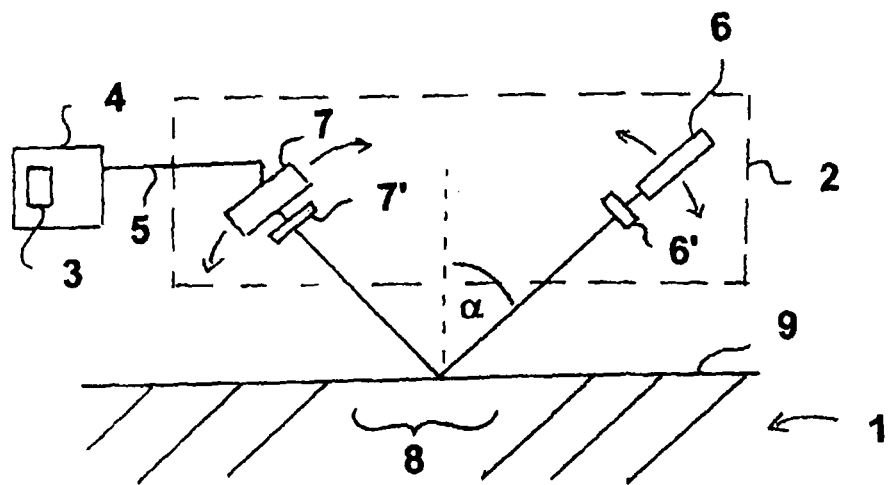

(51) Int. Cl.
*G07D 7/00* (2016.01)
*G07D 7/12* (2016.01)

(58) Field of Classification Search
CPC .. G01N 21/47; G01N 21/636; G01N 21/9501; G01N 21/64; G01N 21/956; G01N 21/55; G01N 21/9503; G01N 33/582; G01N 21/21; G01N 21/6428; G01N 2021/213; G01N 2021/4792; G01N 2021/217; G01N 2021/4707; G01N 2021/4711; G01N 21/65; G01N 21/658; G01N 2035/0436; G01N 21/9506; H01L 22/12; H01L 21/31116; H01L 21/31138; H01L 28/84; H04N 1/32133; H04N 1/32144; H04N 2201/3233; H04N 2201/3236; H04N 2201/327; H04N 2201/3271; G06K 19/086; G06K 19/14; G06K 19/025; G06K 19/02; G06K 19/041; G06K 19/06046; G06K 19/077; G06K 19/083; G06K 19/10; G06K 9/00; G07D 7/121; G07D 7/122; G01J 3/504; C23C 21/31116; C23C 21/31138; C23C 28/84; C12Q 1/6837; C12Q 2563/155; C12Q 1/6825; B82Y 30/00; B01J 2219/00659; G01Q 10/06; G01Q 30/10; G01Q 60/12; G01Q 60/16; G01Q 70/01

USPC ........ 235/492, 494, 454, 379; 356/369, 445, 356/38; 713/176

See application file for complete search history.

(56) References Cited

U.S. PATENT DOCUMENTS

| | | | |
|---|---|---|---|
| 4,767,205 A | | 8/1988 | Schwartz et al. ............... 356/71 |
| 5,757,001 A | * | 5/1998 | Burns .................. G01N 21/359 250/339.09 |
| 6,934,032 B1 | * | 8/2005 | Subramanian et al. ...... 356/445 |
| 7,699,236 B2 | * | 4/2010 | Dana et al. .................... 235/494 |
| 2002/0023218 A1 | * | 2/2002 | Lawandy et al. ............. 713/176 |
| 2002/0048225 A1 | * | 4/2002 | Shinoda ..................... 369/13.05 |
| 2003/0058443 A1 | | 3/2003 | Xu et al. ....................... 356/369 |
| 2003/0062422 A1 | * | 4/2003 | Fateley et al. ................ 235/494 |
| 2005/0018171 A1 | * | 1/2005 | Guittet et al. ................... 356/38 |
| 2005/0106566 A1 | * | 5/2005 | Breniaux et al. ................. 435/6 |
| 2005/0257270 A1 | * | 11/2005 | Grassl ..................... G01J 3/504 726/26 |
| 2006/0132773 A1 | * | 6/2006 | Ebert et al. .................... 356/369 |
| 2009/0002721 A1 | * | 1/2009 | Zangooie et al. ............ 356/620 |

* cited by examiner

METHOD AND APPARATUS FOR IDENTIFYING A PRODUCT

This is a national stage of PCT/EP08/011101 filed Dec. 18, 2008 and published in German, which has a priority of German no. 10 2007 063 415.5 filed Dec. 18, 2007, hereby incorporated by reference.

The present invention relates to a method for recognising a product or information concerning the product, with which a code carried by the product is identified. The invention further relates to a corresponding device for recognising a product or information concerning the product, as well as a system for identifying products which includes such a device and correspondingly coded products. The mentioned products thereby may be given by the most varied of goods.

Such methods and devices are e.g. known per se for reading bar codes. The disadvantage with these known methods is the easy recognisability of the applied codes, on account of which one may easily imitate the codes. E.g. an identification of imitations compared to originals may be prevented by way of this.

It is therefore the object of the present invention to suggest a suitable system for recognising a product or information concerning the product, with which the mentioned disadvantage may be avoided, which thus renders in particular an imitation of the code practically impossible. It is further the object of the invention to suggest a device which is improved with regard to this.

According to the invention, this object is achieved by a method with the features of claim 1 and by a device with the features of claim 18 as well as by a system according to claim 21. Advantageous designs and further developments of the invention are to be deduced from the features of the dependent claims.

With the suggested method for recognising a product or information concerning the product, thus a hidden code carried by the product is identified, wherein the code is given by a set of ellipsometric parameters, and the method comprises the following steps:

measuring ellipsometric variables of at least one defined location on a surface of the product, comparison of the measured ellipsometric variables with at least one reference code and determining an agreement of the measured ellipsometric variables with the reference code or one of the reference codes, or determining a non-agreement with each reference code.

With the at least one reference code, it is typically the case of a previously archived code or of a natural code which is present at least one further location and which may be fixed due to natural surface characteristics, or a label deposited at a defined location (e.g. a type label) or a hidden code (e.g. a rear side of a stuck-on label). Hereinafter, the reference code is indicated throughout as an archived code, wherein however in each case all mentioned possibilities are to be included. The set task in particular is solved with the suggested measures by way of the code—even if its existence e.g. given by a label is to be visible—being hidden inasmuch as the selected ellipsometric variables which are defined by the surface characteristics at the location or the locations of the code, may not be recognised with the naked eye and conventional means—without the knowledge of the code.

On measuring the ellipsometric variables, the changes in the intensity and of a polarisation condition of light which is reflected at the surface of the product, may be measured. With regard to this light, it may be the case of light with wavelengths between UV and NIR. In particular, it may thereby be the case of visible light.

Typically, the ellipsometric variables are measured with an ellipsometer, by way of which light of a defined polarisation is led onto the at least one defined location, and a polarisation-dependent intensity of the light after reflection at the surface is detected. One preferred embodiment of the invention, with regard an as automated as possible implementation of the method, envisages the method being carried out with a device which comprises this ellipsometer and a memory which is connected to the ellipsometer or is integrated into the ellipsometer and serves as a data bank of the at least one code, wherein the device carries out the comparison of the measured ellipsometric variables with the at least one code, and the determining of the agreement or non-agreement, by way of the device being set up in a suitable manner with regard to programming technology.

Accordingly, with the present invention, a device for recognising a product or information concerning the product by way of identifying a hidden code carried by the product, is advantageously suggested, which comprises an ellipsometer for measuring ellipsometric variables of a surface of the product, and a memory which is connected to the ellipsometer via a data lead or is integrated into the ellipsometer, wherein the memory functions as a data bank for at least one set of ellipsometric parameters which is stored there and which serves as a code, and wherein the device, with regard to programming technology, is set up for the comparison of the ellipsometer variables measured with the ellipsometer, with the at least one code stored in the memory and for ascertaining an agreement of the measured ellipsometric variables with the stored code or one of the stored codes, and for ascertaining a non-agreement with each code stored there. Preferably, the mentioned device automatically issues a result reflecting the determined agreement or non-agreement.

Apart from conventional ellipsometers, in the present document, polarisation detectors which are designed as hand apparatus and which measure in an intensity-sensitive and phase-sensitive manner, are included under the term ellipsometer.

For this, the ellipsometer is typically a light source for light of a defined polarisation, as well as a detector for detecting a polarisation-depended intensity of light of the light source, which is reflected at the surface of the product. The light source, which may preferably radiate light of a defined wavelength or wavelength distribution, may for example be given by a laser or by way of a white light source equipped with suitable colour filters. The defined polarisation filter of the light may be realised by way of polarisation filters, possibly supplemented by $\lambda/4$ platelets or comparable elements. A correspondingly advantageous system for identifying products, apart from such a device, finally comprises an entirety of products provided in each case with the code or one of the codes, with which it may be the case of goods of any type.

Under certain circumstances, natural characteristics of the surface of the products may be used as a code. A particularly advantageous embodiment of the invention however envisages the code being artificially deposited on the mentioned at least one location of the product, which is used for the measurement, e.g. by way of coating and/or structuring the surface.

The features specified in the dependent claims are advantageous with regard to the fact that one may code information which under certain circumstances may be quite large, and recognise this with the described method, in a manner which is very difficult to recognise and accordingly difficult to imitate.

Figure 2:
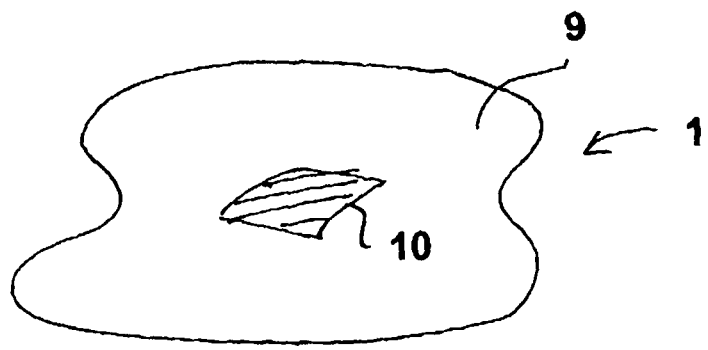
Figure 3:
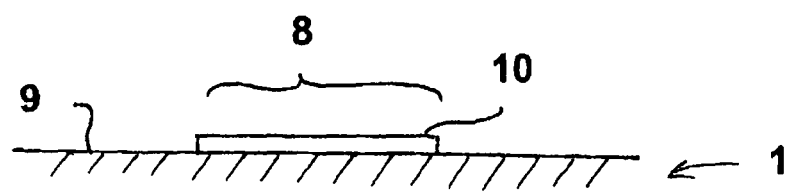
Figure 4:
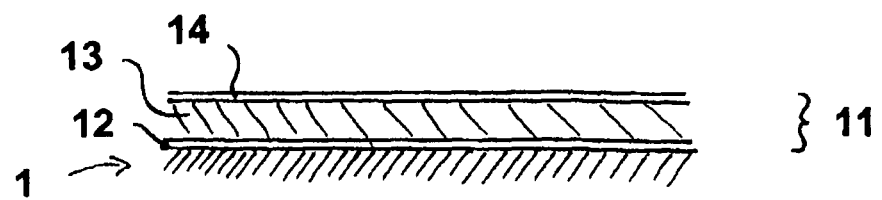

Embodiment examples of the invention are hereinafter explained by way of the FIGS. 1 to 4. There are shown in:

FIG. 1 a schematic representation of a device for recognising a product in one embodiment of the invention, FIG. 2 a perspective view of a surface detail of a coded product which is examined with this device, FIG. 3 a detail of a cross section through the product from FIG. 2, and FIG. 4 a detail of an enlarged cross section through a correspondingly coded product in another embodiment of the invention.

The device shown in FIG. 1, for recognising a product 1 or information concerning the product 1, comprises an ellipsometer 2 and a data processing installation 4 which is provided with a memory 3 and which is connected via a data lead 5 to the ellipsometer. Of course, the data processing installation 4 may also be integrated into the ellipsometer 2.

The ellipsometer 2 comprises a light source 6—for example a laser or a white light source provided with a colour filter or a set of colour filters—which is provided with a polariser 6' and thus throws polarised light onto at least one location 8, onto a surface of the product 1. This light in the present embodiment example has a defined wavelength in the UV range or in the near IR range. Alternatively, the light source 6 may also be designed for radiating light of a defined wavelength spectrum of various wavelengths. After a reflection at the surface 9, this light now falls through a polarisation filter 7' into a detector 7, wherein at least the polarisation filter 8—possibly also the polariser 6'—is designed in a rotatable manner. The detector 7 thus serves for detecting a polarisation-dependent intensity of the reflected light. This arrangement thus permits a measurement of ellipsometric variables for the location 8 of the surface 9 of the product 1, in dependence on the already mentioned wavelength and an angle of incidence α, which is drawn in FIG. 1 and which may be varied as is indicated by arrows.

The product now carries a hidden code, which is given by a set of ellipsometric parameters which correspond to the ellipsometric variables which are measured at the location 9 or at several such defined locations 9. This code has been previously archived by way of storing the parameters in the memory 3. Additionally, one may store further codes for other products there. With regard to the product 1, it is the case accordingly of a suitably coded product from a complete entity.

The measured ellipsometric variables are now compared to the code previously stored in the memory 3 or the codes which are archived there, wherein an agreement of the measured ellipsometric variables with the archived code or one of the archived codes, or however a non-agreement with each archived code, is determined by way of a suitable program-technological device of the data processing installation 4. The data processing installation 4 finally issues a result reflecting the determined agreement or non-agreement.

The set of ellipsometric parameters which serves as a code for the defined location 8 or for each of the defined locations 8 on the surface 9 of the product 1, in each case comprises two values for each of several combinations of at least one defined wavelength or wavelength distribution of the light source 6 and several defined angles of incidence α (preferably between 30° and 60°). The ellipsometric variables are accordingly measured for all these combinations of wavelengths or wavelength distributions and angles of incidence α. The mentioned two values thereby in each case are given by an amount $\psi$ of a quotient of two reflection coefficients for two different polarizations, and by way of a (also indicated as a phase difference of the phase shifts) change $\Delta$ of a phase shift between reflected light components of these polarizations. Thereby, for example $\psi = r_p/r_s$ and $\Delta = \delta_p - \delta_s$, wherein $r_p$ and $r_s$ indicate reflection coefficients for two different polarizations and $\delta_p$ and $\delta_s$ phase shifts for light of these polarizations. If the light source 6 e.g. is designed in a suitable manner for emitting different wavelengths, e.g. by way of a set of several colour filters, the ellipsometric data may also be measured for two or more different wavelengths or wavelength distributions. Then of course the code also contains parameters for correspondingly many wavelengths or wavelength spectra.

For the described method, the natural—thereby very product-specific—surface characteristic of the product 1 may be used as a code in a defining manner. With the present embodiment example, the code however has been deposited onto the at least one location 8 of the product 1 artificially by way of coating and possibly additional structuring of the surface 9, as a label, which is shown in FIG. 2. A detail of a perspective view of the surface 9 of the product 1 is represented there. The label 10 here has an area of about 1 cm², and FIG. 3 shows a cross section through the same surface 9. The label 10 is realised here by a layer of about 40 nm thickness, which may not be recognised or hardly be recognised with the naked eye. Alternatively however, one may also use thicker layers of e.g. up to 1 µm. The mentioned layer here is formed by SiO, TiO or another oxide or by way of titanium nitride or another nitride. Also other, in particular dielectric materials with a defined surface structure and layer thickness may be used. The mentioned materials are suitable for the coding in the described manner on account of their durability, thus long-term stability. Additionally, the label 10 may be designed with a spatial structure, so that the artificial code contains a defined location-dependency of the ellipsometric variables. The code may e.g. contain a bar code, if the layer forming the label 10 is designed in a suitably interrupted manner. Although this is not necessary, it however permits a code of a larger quantity of information.

Typically, the code is defined exclusively by surface characteristics of the deposited label 10. Alternatively, it may also be defined by a combination of surface characteristics of the label 10 and a naturally left part of the surface 9 which surrounds the label 10. This renders the code much more secure with regard to the thus ruled-out possibility of detaching the label 10 and attaching it successfully to a fake of the product 1. In order to determine the location dependency of the ellipsometric variables, these variables with the present embodiment of the method for recognising the product 1, are measured by way of imaging ellipsometry (with surface-detection of the surface 9 with respect to the ellipsometric characteristics), for example carried out as a so-called zero-ellipsometry and preferably also in the environment of the Brewster angle. The label 10 may also be provided with pigments or e.g. UV-active fibres for realising more significant ellipsometric variables for a suitable code.

A detail through a comparable label 10 with another embodiment of the invention is show in FIG. 4. Here too, a suitable code is deposited by the label 10 in the form of a coating, onto a surface of the product 1. Thereby, the label 10 here forms a Febry-Perot layer system which comprises a lower, mirroring metallic layer 12, a transparent intermediate layer 13 and thereon a metallic semitransparent layer 4. Each of the layers 12 and 14 may e.g. be formed of aluminium, titanium, chrome, silver, gold or copper. The layer 14 is extremely thin, and with regard to the semi-transparency, is preferably not thicker than 40 nm. The intermediate layer 13 may again be formed from the materials for the label 10 of the FIGS. 2 and 3, said material being advantageous on account of its durability, thus from SiO, TiO or another oxide or from titanium nitride or another nitride. Of course, yet a scratch-proof, transparent protective layer may be arranged on the layer 14, which is not represented in FIG. 4.

The code which is realised by the respective label 10 with the present embodiment examples, may stand for the authenticity of the product, for the assignment of the product to a defined series, or a defined treatment, or for a fatigue condition of the product 1.

The invention claimed is:

1. A method for discriminating between an imitation of a product and an original of the product by using a hidden code and at least one reference code, the hidden code and the at least one reference code comprising at least a pair of values measured at:
   a defined wavelength or a defined wavelength distribution of a light directed on the product, and at
   a defined angle of incidence $\alpha$ of the light, the light having the defined wavelength or the defined wavelength distribution, wherein the light is selected to comprise a wavelength between UV and NIR, the light being directed on the product;
   wherein the hidden code and the at least one reference code are given by a set of ellipsometric parameters which are measurable with an ellipsometer by a polarization-dependent intensity of the light after reflection by the surface at a given location,
   wherein the hidden code and the at least one reference code carried by the original of the product are hidden to the naked eye,
   wherein the set of ellipsometric parameters includes natural surface characteristics of at least a portion of the surface of the original of the product at the given location,
   wherein the set of ellipsometric parameters comprises a value $\Psi$ and a value $\Delta$, with $\Psi$ being a quotient of two reflection coefficients measured for two different polarizations, and with $\Delta$ comprising a phase shift between reflected light components of these two different polarizations, the method comprising the following steps:
   providing a test product, wherein the test product is the imitation of the product or the original of the product;
   defining the wavelength or wavelength distribution of the test product;
   defining several angles of incidence $\alpha$ of the test product;
   providing the at least one reference code;
   measuring ellipsometric variables for at least one defined location on a surface of the product and at several defined angles of incidence $\alpha$,
   comparing the measured ellipsometric variables with the at least one reference code,
   determining an agreement of the measured ellipsometric variables with the at least one reference code, or one of the at least one reference codes, or determining a non-agreement with each of the at least one reference codes,
   and
   identifying the imitation of the original product by determining the non-agreement with each of the at least one reference codes.

2. The method according to claim 1, the ellipsometer comprising a memory which is connected to the ellipsometer or is integrated into the ellipsometer and which serves as a data bank for the at least one reference code carrying out a comparison of the measured ellipsometric variables with the at least one reference code and the determining of an agreement or non-agreement by way of a suitable device with regard to programming technology.

3. The method according to claim 2, wherein the device issues a result which reflects the determined agreement or non-agreement.

4. The method according to claim 1, wherein the set of ellipsometric variables serving as the hidden code are measured at a first angle of incidence $\alpha$ and the measured ellipsometric variables of the hidden code at the first angle of incidence $\alpha$ are compared to the ellipsometric variables of the corresponding reference code at the first angle of incidence $\alpha$.

5. The method according to claim 4, wherein the set of ellipsometric parameters each include two values that are given by an amount $\psi$ of a quotient of two reflection coefficients for two different polarizations, and by way of a change $\Delta$ of a phase shift between reflected light of the polarization.

6. The method according to claim 1, wherein the ellipsometric variables are measured for at least two different angles of incidence $\alpha$ and at least two different wavelengths or wavelength distributions and wherein the ellipsometric variables at a first angle of incidence $\alpha$ are compared with a first reference code corresponding to the first angle of incidence $\alpha$ and the ellipsometric variables at a second angle of incidence $\alpha$ are compared with a second reference code corresponding to the second an of incidence $\alpha$.

7. The method according to claim 1, wherein the surface of the product for measuring the ellipsometric variables is illuminated with at least one of ultraviolet light and light of the near infrared region.

8. The method according to claim 1, wherein the hidden code includes an artificially deposited hidden code portion that has been previously deposited on the at least one location of the product artificially by way of at least one of coating and structuring the surface.

9. The method according to claim 8, wherein the artificially deposited hidden code portion contains a defined location-dependency of the ellipsometric variables.

10. The method according to claim 9, wherein the artificially deposited hidden code portion contains a bar code or at least another geometric code.

11. The method according to claim 8, wherein the hidden code is defined by way of a combination of surface characteristics of at least one deposited label and of a natural surface of the original of the product surrounding the at least one label.

12. The method according to claim 1, wherein the ellipsometric variables are measured by at least one of zero ellipsometry and imaging ellipsometry.

13. The method according to claim 1, wherein the hidden code represents an authenticity of the product, an allocation of the product to a defined series, or an executed maintenance or defined treatment or a fatigue condition of the product.

14. A device for recognizing an imitation of a product, wherein an original of the product carries a hidden code, the hidden code comprising a set of ellipsometric variables indicative, at least in part, of natural surface characteristics of the original of the product, the device comprising:

an ellipsometer for measuring ellipsometric variables of a surface of the product, and a memory which is connected to the ellipsometer and which functions as a data bank for at least one set of ellipsometric parameters indicative, at least in part, of natural surface characteristics of the original of the product, which is stored there and which serves as a hidden code, the ellipsometric parameters including a wavelength or wavelength distribution and also several angles of incidence $\alpha$, wherein the set of ellipsometric parameters comprises a value $\Psi$ and a value $\Delta$, with $\Psi$ being a quotient of two reflection coefficients measured for two different polarizations, and with $\Delta$ comprising a phase shift between reflected light components of these two different polarizations, the device, with regard to programming technology, being set up for comparison of the ellipsometric variables measured with the ellipsometer, with the at least one reference code stored in the memory, and identifying an imitation of the original product by determining a non-agreement with each reference code stored there, and the measured ellipsometric variables measuring changes of an intensity and of a polarization condition of light at several defined oblique angles of incidence, which is reflected on the surface of the product and the ellipsometric variables being measured with the ellipsometer, by way of which light of the defined polarization is led onto at least one defined location on the surface, and a polarization-dependent intensity of the light is detected after a reflection on the surface from the several defined oblique angles of incidence.

15. The device according to claim 14, wherein the ellipsometer comprises a light source for light of a defined polarization, and a detector for detecting a polarization-dependent intensity of light of the light source, which is reflected on the surface of the product.

16. A system for identifying falsified products, comprising:

a device for discriminating between an imitation of a product and an original of the product, the device comprising:

an ellipsometer for measuring ellipsometric variables of a surface of the product, wherein the original of the product carries a hidden code that is hidden to the naked eye, wherein a set of ellipsometric parameters measurable at a given location and inclusive of natural surface characteristics of at least a portion of a surface of the original of the product at the given location serves as the hidden code, wherein the ellipsometric parameters include a wavelength or wavelength distribution and also several angles of incidence $\alpha$, wherein the set of ellipsometric parameters comprises a value $\Psi$ and a value $\Delta$, with $\Psi$ being a quotient of two reflection coefficients measured for two different polarizations, and with $\Delta$ comprising a phase shift between reflected light components of these two different polarizations;

a memory which is connected to the ellipsometer via a data lead or which is integrated into the ellipsometer and which functions as a data bank for at least one set of ellipsometric parameters indicative, at least in part, of natural surface characteristics of the original of the product which is stored there; wherein each set of ellipsometric parameters serves as a reference code;

the device, with regard to programming technology, configured to compare the ellipsometric variables measured with the ellipsometer, with the at least one reference code stored in the memory, and configured to determine at least one of an agreement of the measured ellipsometric variables with the stored reference code or one of the stored reference codes, and a non-agreement with each reference code stored there, wherein an agreement of the measured ellipsometric variables with the stored reference code or one of the stored reference codes identifies an original of the product and wherein a non-agreement with each reference code stored there identifies an imitation of the original product; and the measured ellipsometric variables measuring changes of an intensity and of a polarization condition of light at several defined oblique angles of incidence, which is reflected on the surface of the product and the ellipsometric variables being measured with the ellipsometer, by way of which light of a defined polarization is led onto the at least one defined location, and a polarization-dependent intensity of the light is detected after a reflection on the surface from the several defined oblique angles of incidence, and an entirety of the products being provided in each case with the hidden code or one of the hidden codes.

17. The device according to claim 14, wherein the hidden code is given by at least one of a Fabry-Perot layer system, a dielectric layer system, and another layer system.

18. The system for identifying falsified products according to claim 16, wherein the hidden code is given by at least one of a Fabry-Perot layer system, a dielectric layer system, and another layer system.

19. The method according to claim 8, wherein the artificially deposited hidden code is given by at least one of a Fabry-Perot layer system, a dielectric layer system and another layer system.

20. The device of claim 14, wherein the memory is connected to the ellipsometer via a data lead.

21. The device of claim 14, wherein in the memory is integrated into the ellipsometer.

22. The system of claim 16, wherein the memory is connected to the ellipsometer via a data lead.

23. The system of claim 16, wherein in the memory is integrated into the ellipsometer.

* * * * *